United States Patent Office 2,914,567
Patented Nov. 24, 1959

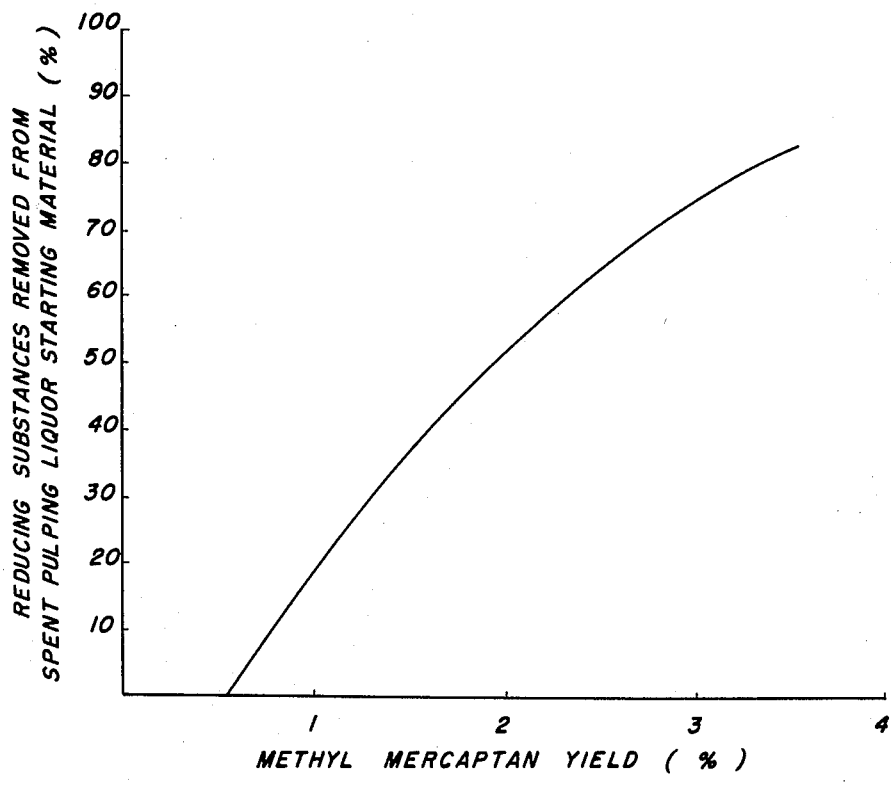

2,914,567

MAKING METHYL MERCAPTAN FROM DESUGARED SPENT SULFITE PULPING LIQUORS

David W. Goheen and William M. Hearon, Camas, Wash., assignors to Crown Zellerbach Corporation, San Francisco, Calif., a corporation of Nevada Application December 6, 1957, Serial No. 701,075

20 Claims. (Cl. 260—609)

This invention relates to a process of making methyl mercaptan from desugared spent sulfite pulping liquors, i.e. from such liquors from which part of their content of sugars and other reducing substances have been removed.

Methyl mercaptan, the end product of the presently described process, is useful commercially as an odorant, and as a starting material in the manufacture of various derivative chemicals, such as methionine and dimethyl disulfide.

Methyl mercaptan has been produced heretofore from spent pulping liquors, particularly from spent alkaline pulping liquors. For instance, U.S. Patent No. 2,711,430 to Hägglund et al., discloses a process wherein a relatively small amount of methyl mercaptan is produced as an intermediate product in the synthesis of dimethyl sulfide from spent pulping liquors. The copending application of Goheen, Serial No. 617,334, now U.S. 2,840,614, of which this application is a continuation-in-part, discloses a method of making methyl mercaptan from unsulfonated lignin materials, such as kraft or soda spent pulping liquors. However, attempts to produce methyl mercaptan commercially from sulfite spent pulping liquor have not been encouraging since the yields of methyl mercaptan have been very low.

Accordingly it is the general object of this invention to provide an improved process for making methyl mercaptan from spent sulfite pulping liquor in much higher yields than have been obtained heretofore.

It is also another object of this invention to provide a process for making methyl mercaptan in commercial quantities from spent sulfite pulping liquors which are available in large quantities at very low cost.

The manner in which the foregoing and other objects of this invention are accomplished will be apparent from the instant specification and the claims considered together with the accompanying drawing consisting of a graph illustrating the effect of desugaring sulfite spent liquor on the yield of methyl mercaptan obtainable by the presently described process.

The present invention is predicated on the discovery that a primary reason for the low yields of methyl mercaptan product produced from unmodified sulfite spent liquor resides in the fact that chemically reducing substances contained in the spent sulfite liquor induce undesirable side reactions which decrease materially the final yield of methyl mercaptan. Such reducing substances consist primarily of reducing sugars, other carbohydrates, and certain lignin sulfonic acids which have a reducing action as determined by the conventional Fehling test for reducing materials. They may be present in the amount of from 15–35% by weight of the spent sulfite liquor solids.

Generally stated, the herein described process of making methyl mercaptan comprises removing or degrading at least 10% by weight of the content of chemically reducing substances from a spent sulfite spent liquor, insuring that the pH of the liquor from which the reducing substances have been removed lies above a value of 7, and adding to the liquor from 1 to 15% by weight, liquor solids basis, of an inorganic sulfur-bearing substance capable of reacting with the methoxyl groups of the lignin to form methyl mercaptan. The resulting mixture then is heated in a reaction zone at a temperature of from 180 to 500° C. for a time sufficient to produce a substantial amount of methyl mercaptan which is removed from the reaction zone substantially as soon as it is produced. In this manner the methoxyl content of the sulfonated lignin contained in the spent sulfite liquor may be converted in good yields to a substantially pure methyl mercaptan product before it can react further in the reaction zone to form dimethyl sulfide.

The sulfite spent pulping liquor which is the starting material for the presently described process may be derived from the pulping of any of the conventional lignocellulose raw materials such as the coniferous species of trees, particularly hemlock, spruce, and white fir; the deciduous species of trees and other plant material such as straw, bagasse, etc. These materials in comminuted form are pulped with ammonium, sodium, calcium, or magnesium bisulfite under acid, neutral or alkaline conditions.

In the acid sulfite process where the cooking liquor consists of an aqueous solution of bisulfite together with an excess of sulfur dioxide, the pH of the cooking liquor is generally from 1.5 to 5. In the so called bisulfite process, where a smaller proportion of sulfur dioxide is employed, the pH of the liquor is from 5 to 7. In the neutral or alkaline sulfite process, an alkaline buffer is added to the liquor so that its initial pH may range from 7 to 12, depending upon the amount of alkali used.

In a typical instance of the application of the conventional acid sulfite procedure, the lignocellulose is cooked in digesters at 120° to 155° C. and 65 to 125 p.s.i. for from 6 to 24 hours. The pressure then is reduced and the cellulose pulp product separated from the spent liquor.

The spent sulfite liquor which constitutes the starting material for the present invention comprises principally sulfonated lignin in the form of salts of lignin sulfonic acids present in amount of from about 50 to 75% by weight, liquor solids basis. In addition, there is present from about 15 to 35% by weight, liquor solids basis, of wood decomposition products having the common property of reducing Fehling solution. As noted above, these reducing materials comprise principally reducing sugars and other carbohydrates, together with certain proportion of lignin sulfonic acids having a reducing action. In accordance with the present invention, these reducing materials must be substantially removed from the spent liquor in order to secure a high yield of methyl mercaptan.

Any one of several different procedures may be employed for the indicated purpose. In one such procedure, the spent liquor is steam-stripped to remove free sulfur dioxide, cooled to 80° F. and treated with certain nutrients as necessary to add missing essential elements and adjust the pH. These nutrients are commonly ammonium hydroxide, diammonium phosphate and potassium chloride. The liquor is fermented with *Torula utilis*, an organism which has been demonstrated to be the most satisfactory for the production of food yeast or with other organisms having the common property of altering the reducing substances present in sulfite spent pulping liquor. The yeast is then removed from the liquor by centrifuging.

In another desugaring procedure, sulfite spent liquor is dialyzed to separate 50% of the lignin sulfonic acids as non-dialyzable material. The dialyzable fraction then is further separated by passing it through two ion exchange columns, the first to deash it and the second to separate the sugars from the lignin sulfonic acids.

In a third desugaring process, the spent liquor is treated with lime to remove sulfur dioxide and the resulting alkaline liquor is treated with air to oxidize various organic substances, i.e. sugars, which are present.

In a fourth such process, lime is added to spent sulfite liquor first to precipitate calcium sulfite. Then a further quantity of lime is added to precipitate the lignin as basic calcium lignin sulfonates which are separated from the sugars by filtration and are then partially neutralized to form calcium lignin sulfonates.

The desugared sulfite spent liquor remaining after the manufacture of ethyl alcohol therefrom by fermentation procedures, as well as the liquor remaining after the alkaline oxidation process used in the manufacture of vanillin also are suitable as raw materials for the present process.

The modified spent liquors resulting from the foregoing procedures conventionally are termed "desugared sulfite spent liquors" and the procedures by which they are treated are conventionally termed "desugaring." Hence, the products and processes are thus denominated herein, although more is involved than a simple removal of the sugar content of the liquors.

As is indicated in the drawing, in order to increase materially the ultimate yield of methyl mercaptan obtained, the desugaring operation should be carried on until at least 10%, and preferably at least 50%, by weight, of the reducing substances have been separated from the spent liquor or converted to non-reducing degradation products.

Since the solids content of the usual sulfite spent liquor is about 10 to 20% by weight, it is preferred to concentrate it either before or after desugaring in order to provide a liquor having a solids content of from 30 to 60% by weight. The concentration of the spent liquor may be effectuated in any suitable equipment such as conventional atmospheric or vacuum evaporators. If desired, the concentrated spent liquor then may be further dehydrated by spray drying or otherwise to a substantially dry powder.

Where the liquor does not have an inherent pH of at least 7, preferably from 11 to 14, it may be treated with alkaline agents as required for pH adjustment to the desired level. Alkaline agents suitable for this use are the hydroxides, oxides, or carbonates of the alkaline metals, the preferred agent being sodium hydroxide. Any of these agents may be added to the liquor with stirring until the selected pH value has been obtained.

After the spent sulfite liquor has been subjected to this preliminary treatment for decreasing its content of reducing substances, for adjustment of its solids content and for adjustment of its pH, it is mixed with a predetermined quantity of an inorganic sulfur bearing substance suitable for conversion of the methoxyl groups of the lignin sulfonic acids to reaction products, methyl mercaptan being the principal end product. A diversity of inorganic sulfur bearing materials may be used for this purpose, as long as they are soluble in aqueous solutions and are capable of converting lignin methoxyls to methyl mercaptan. Examples are elemental sulfur; the water soluble sulfides, such as the alkali metal sulfides including sodium sulfide and potassium sulfide; ammonium sulfide; hydrogen sulfide; the water soluble thiosulfates, particularly sodium thiosulfate; the water soluble polysulfides, particularly sodium polysulfide; calcium polysulfide; and the water soluble hydrosulfides, particularly sodium hydrosulfide. Elemental sulfur, sodium sulfide, or mixtures thereof are preferred members of the foregoing group.

Although the quantity of the sulfur bearing substance to be added to the spent liquor is somewhat variable, depending upon the nature and identity of the substance and of the spent liquor employed, a sufficient amount to furnish from 1 to 15% by weight of sulfur based on the spent liquor solids, is generally suitable. The preferred amount of the sulfur bearing substance is sufficient to provide from 3 to 10% by weight of sulfur, liquor solids basis.

The mixture of spent sulfite liquor and sulfur bearing material is placed in a reactor with or without means for agitating its contents. The reactor is provided with means for withdrawing the methyl mercaptan continuously, substantially as soon as it is formed in the reaction zone, for separating it from any condensible gases which may be formed, and for condensing it.

It may be placed, for example, in a reactor fitted with a valve suitable for continuous relief and communicating first with a water cooled condenser and then with a trap cooled with a freezing mixture adequate for reducing the temperature to one at which the methyl mercaptan will condense. If desired, methyl mercaptan may be collected in a receiver containing an alkaline solution, or it may be fractionally distilled.

The reaction is carried out under conditions calculated to produce a maximum yield of methyl mercaptan in minimum time with minimum production of undesirable by-products. In general, it should be carried out at a temperature from 180 to 500° C., preferably from 200 to 300° C. The reaction time may vary from a period of but a few seconds at elevated temperature to one of a few hours at lower temperatures. In general, a time period of from 5 to 60 minutes is adequate when a temperature of from 200 to 300° C. is employed.

Whatever the total reaction period, the conditions are adjusted so that the methyl mercaptan is withdrawn from the reaction zone substantially as soon as it is formed. In this manner the formation of dimethyl sulfide in the reaction zone is minimized.

The methyl mercaptan product may be applied directly to various commercial uses in the form in which it is obtained, or it may be further purified by conventional methods, such as by distillation, or by reaction with an alkaline material to form a mercaptide which thereafter may be treated with an acid to liberate pure methyl mercaptan.

The process of the present invention is illustrated further by the following examples.

*Example 1*

500 grams of sulfite spent liquor derived from pulping a coniferous species of trees by the calcium base acid sulfite process was desugared by yeast fermentation with *Torula utilis* until its content of reducing substances had been decreased from an original value of 21% to 4% by weight, liquor solids basis, i.e. until 81% of the reducing substances had been removed.

The desugared liquor was concentrated to a solids content of 40%. Its pH then was adjusted with sodium hydroxide from an original value of 4.5 to 8.5. Thereafter 35 grams of technical grade sodium sulfide (60% $Na_2S$) and 8.7 grams elemental sulfur were added to the liquor. This corresponded to a sulfur use of 8.7%, liquor solids basis. The pH of the liquor after the addition of the sulfur bearing materials was 12.7.

The resulting mixture was placed in a one-liter stainless steel autoclave provided with heating and agitating means and connected through a relief valve first to a water-cooled condenser fitted with a receiver and then to a trap cooled with Dry Ice and acetone.

Heating and stirring of the reaction mixture were started at substantially room temperature. The temperature of the mixture was gradually increased to 220° C. and maintained at this temperature for 40 minutes with the gaseous reaction products being continuously vented. At the end of the reaction period, the Dry Ice cooled trap contained 6.6 grams of methyl mercaptan, representing a yield of 3.3% methyl mercaptan, liquor solids basis. The residue in the autoclave was fluid and pumpable.

Example 2

This example illustrates the application of the presently described process wherein a lesser amount of reducing substances was removed prior to the methyl mercaptan converting step than was used in Example 1.

Following the general procedure outlined in Example 1, 500 grams of calcium base sulfite spent liquor as described in Example 1 was desugared by yeast fermentation with *Torula utilis* until its original content of 21% by weight reducing substances had been decreased to 10% by weight thereof. This represented a 52% removal of reducing substances.

The resulting liquor was concentrated to a solids content of 40% and alkalized with sodium hydroxide to a pH of 9. Thereafter 29 grams of sodium sulfide (60% $Na_2S$) and 7.2 grams elemental sulfur were added. This corresponded to a sulfur use of 7.2%, liquor solids basis. The pH of the mixture was 13.4.

The mixture was heated under the same conditions as in Example 1 with continuous venting of the gases. At the end of the reaction period, the Dry Ice cooled trap contained 4 grams of methyl mercaptan, corresponding to a 2% yield based on the liquor solids. The residue in the reactor was fluid and pumpable.

Example 3

This example illustrates the application of the herein described procedure to the production of methyl mercaptan from sulfite spent liquor which has been desugared by treatment with lime.

A 40% solids aqueous solution of calcium lignin sulfonate was prepared from calcium base sulfite spent liquor by precipitation with lime, thereby separating the lignin sulfonates from all but about 4% of the reducing substances, corresponding to an 81% removal thereof. The liquor then was neutralized with sulfuric acid to a pH of about 7. To 500 grams of the resulting solution there was added sufficient sodium hydroxide to adjust its pH to 8.8. Thereafter 35 grams sodium sulfide (60% $Na_2S$) and 8.7 grams sulfur were added thereto, corresponding to a use of 8.7% sulfur, liquor solids basis.

The mixture was heated under substantially the same conditions as employed in Example 1. The yield of methyl mercaptan was 6.8 grams, corresponding to 3.4% based on the liquor solids. The residue in the autoclave was fluid and suitable for pumping.

Example 4

This example illustrates the application of the presently described process using a lesser amount of sulfur bearing substances.

500 grams of sulfite spent liquor derived from pulping of a mixture of western hemlock and white fir by the ammonium base acid sulfite process was desugared by fermenation with an organism of the genus Pseudomonas until its content of reducing substances had been decreased from 21% to 4.7% by weight, liquor solids basis, corresponding to a removal of 78% of the reducing substances from the liquor.

The desugared liquor was concentrated to a solids content of 39.4%, treated with sodium hydroxide to a pH of 8.5, and mixed with 22 grams of sodium sulfide (60% $Na_2S$) and 4.2 grams elemental sulfur. This corresponded to a sulfur use of 4.9% based on the liquor solids. The pH of the mixture was 12.4.

The reaction was carried out under substantially the same conditions as described in Example 1. The yield of methyl mercaptan was 4 grams, corresponding to 2.1% based on the liquor solids. The residue in the autoclave was fluid and suitable for pumping.

Example 5

This example illustrates the application of the presently described process to a spent sulfite liquor desugared by alkaline air oxidation.

Desugared sulfite spent liquor having a solids content of 40% was prepared by alkalizing ammonium base sulfite spent liquor with sodium hydroxide to a pH value of about 12, heating the mixture to a temperature of about 70° C., and passing air through the liquor until approximately 90% of its original content of reducing substances had been converted to non-reducing products. 500 grams of this desugared liquor was mixed with 35 grams sodium sulfide (60% $Na_2S$) and 8.6 grams sulfur, corresponding to a total sulfur use of 8.7%. The pH of the mixture was adjusted to 12.9 and the mixture was heated in a manner similar to that described in Example 4. The yield of methyl mercaptan was 3.4 grams, or 1.7% based on the liquor solids. The residue in the autoclave was a thick, pumpable fluid.

Thus it will be apparent that by the present invention we have provided a process for making methyl mercaptan which is effective in converting the methoxyl groups of sulfonated lignins contained in sulfite spent liquors into a yield of methyl mercaptan which is markedly higher than that obtained heretofore. Since approximately 2 million tons of sulfite spent liquor solids are produced annually in the United States, this improvement makes potentially available a vastly increased total quantity of methyl mercaptan for its various commercial applications. The present process is applicable to liquors which have been desugared by any of the common procedures and thus makes use of a readily available, low cost starting material. Furthermore, it may be incorporated into the conventional sulfite pulp mill system for recovering various chemical products, or for manufacturing phenolic resins, tanning materials, dispersing agents, etc.

Having thus described our invention in preferred embodiments, we claim as new and desire to protect by Letters Patent:

1. A process of making methyl mercaptan which comprises decreasing the content of chemically reducing substances in sulfite spent pulping liquor by at least 10% by weight, solids basis; insuring that the pH of the resulting liquor is above 7; adding to the resulting alkaline liquor from 1 to 15% by weight, based on the liquor solids, of sulfur in the form of an inorganic sulfur bearing substance comprising at least one member of the group consisting of elemental sulfur and the water-soluble sulfides, thiosulfates, polysulfides and hydrosulfides; heating the mixture in a reaction zone at a temperature of from 180–500° C. for a time sufficient to produce a substantial amount of methyl mercaptan, and removing the methyl mercaptan product from the reaction zone substantially as soon as it is produced.

2. The process of claim 1 wherein the reducing substance content of the sulfite spent liquor is decreased by bacterial fermentation.

3. The process of claim 1 wherein the reducing substance content of the sulfite spent liquor is decreased by ion exchange and dialysis.

4. The process of claim 1 wherein the reducing substance content of the sulfite spent liquor is decreased by oxidation with oxygen containing gases in alkaline media.

5. The process of claim 1 wherein the reducing substance content of the sulfite spent liquor is decreased by lime precipitation of the lignin sulfonic acids contained in the liquor and separation of the resulting calcium lignin sulfonates from the reducing substances.

6. The process of claim 1 wherein the sulfite spent liquor has a solids content of from 30–60% by weight.

7. The process of claim 1 wherein the reducing substance content of the liquor is decreased by at least 50% by weight.

8. The process of claim 1 wherein the pH of the liquor is 11–14.

9. The process of claim 1 wherein the amount of sulfur in the form of the inorganic sulfur bearing substances is from 3–10% by weight, based on the liquor solids.

10. The process of claim 1 wherein the inorganic sulfur bearing substance comprises sodium sulfide.

11. The process of claim 1 wherein the inorganic sulfur bearing substance comprises elemental sulfur.

12. The process of claim 1 wherein the mixture is heated at a temperature between 200° C. and 300° C.

13. The process of making methyl mercaptan which comprises decreasing by at least 10% by weight the amount of chemically reducing substances contained in sulfite spent liquor, concentrating the resulting desugared liquor to a solids content of from 30–60% by weight, insuring that the pH of the resulting liquor is between 11 and 14; adding to the liquor from 3–10% by weight, based on the liquor solids, sulfur in the form of an inorganic sulfur bearing substance comprising at least one member of the group consisting of elemental sulfur and the water soluble sulfides, thiosulfates, polysulfides, and hydrosulfides; heating the mixture in a reaction zone at a temperature of from 200–300° C. for a time sufficient to produce a substantial amount of methyl mercaptan and removing the methyl mercaptan product from the reaction zone substantially as soon as it is produced.

14. The process of claim 13 wherein the inorganic sulfur bearing subtsance comprises sodium sulfide.

15. The process of claim 13 wherein the inorganic sulfur bearing substance comprises elemental sulfur.

16. The process of claim 13 wherein the reducing substance content of the liquor is decreased by at least 50% by weight.

17. A process of making methyl mercaptan which comprises providing desugared sulfite spent liquor from which at least 10% by weight of its content of reducing substances has been removed, insuring that the pH of the liquor is above 7, adding to the liquor from 1–15% by weight based on the liquor solids, of sulfur in the form of an inorganic sulfur bearing substance comprising at least one member of the group consisting of elemental sulfur and the water-soluble sulfides, thiosulfates, polysulfides and hydrosulfides, heating the mixture in a reaction zone at a temperature of from 180–500° C. for a time sufficient to produce a substantial amount of methyl mercaptan and removing the methyl mercaptan product from the reaction zone substantially as soon as it is produced.

18. The process of making methyl mercaptan which comprises providing desugared sulfite spent liquor from which at least 50% by weight of its content of reducing substances has been removed and having a solids content of from about 30% to 60% by weight, insuring that the pH of the liquor is between 11 and 14; adding to the liquor from 3% to 10% by weight, based on the liquor solids, of sulfur in the form of an inorganic sulfur-bearing substance comprising at least one member of the group consisting of elemental sulfur and the water-soluble sulfides, thiosulfates, polysulfides, and hydrosulfides; heating the mixture in a reaction zone at a temperature of from 200–300° C. for a time sufficient to produce a substantial amount of methyl mercaptan and removing the methyl mercaptan product from the reaction zone substantially as soon as it is produced.

19. The process of claim 18 wherein the inorganic sulfur-bearing substance comprises elemental sulfur.

20. The process of claim 18 wherein the inorganic sulfur-bearing substance comprises sodium sulfide.

References Cited in the file of this patent

UNITED STATES PATENTS 2,711,430    Hagglund et al. _____ June 21, 1955